(12) United States Patent
Bayer et al.

(10) Patent No.: US 10,144,805 B2
(45) Date of Patent: Dec. 4, 2018

(54) COPOLYAMIDES, MOULDING COMPOUNDS COMPRISING THESE AND MOULDED ARTICLES PRODUCED THEREFROM

(71) Applicant: EMS-PATENT AG, Domat/Ems (CH)

(72) Inventors: Andreas Bayer, Domat/Ems (CH); Manfred Hewel, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 40 days.

(21) Appl. No.: 15/285,947

(22) Filed: Oct. 5, 2016

(65) Prior Publication Data

US 2017/0107326 A1    Apr. 20, 2017

(30) Foreign Application Priority Data

Oct. 14, 2015   (EP) ..................... 15189826

(51) Int. Cl.
| | | |
|---|---|---|
| *C08G 69/26* | (2006.01) | |
| *C08K 7/14* | (2006.01) | |
| *C08G 69/36* | (2006.01) | |
| *C08L 77/06* | (2006.01) | |

(52) U.S. Cl.
CPC ............. *C08G 69/265* (2013.01); *C08K 7/14* (2013.01); *C08G 69/36* (2013.01); *C08L 77/06* (2013.01)

(58) Field of Classification Search
CPC ................................... C08G 69/265
See application file for complete search history.

(56) References Cited

U.S. PATENT DOCUMENTS

| | | | | |
|---|---|---|---|---|
| 4,404,317 A | * | 9/1983 | Epstein ................... | C08L 77/00 138/118 |
| 5,688,901 A | * | 11/1997 | Fisch ................... | C08G 69/265 524/600 |
| 6,130,312 A | * | 10/2000 | Murakami ........... | C08G 69/265 528/335 |
| 8,765,902 B2 | | 7/2014 | Desbois et al. | |
| 2010/0190952 A1 | | 7/2010 | Desbois et al. | |
| 2016/0152770 A1 | | 6/2016 | Richter et al. | |

FOREIGN PATENT DOCUMENTS

| | | |
|---|---|---|
| WO | WO 2008/155271 A1 | 12/2008 |
| WO | WO 2014/198762 A1 | 12/2014 |

* cited by examiner

*Primary Examiner* — Michael F Pepitone
(74) *Attorney, Agent, or Firm* — Leydig, Voit & Mayer, Ltd.

(57) ABSTRACT

The invention relates to copolyamides which are formed from a diamine component, a dicarboxylic acid component and possibly a lactam- and/or ω-amino acid component. Furthermore, the invention relates to a polyamide moulding compound which comprises at least one of these copolyamides. Moulded articles produced from these moulding compounds are used in the automobile field, in the domestic field, in measuring-, regulating- and control technology or in mechanical engineering.

14 Claims, No Drawings

COPOLYAMIDES, MOULDING COMPOUNDS COMPRISING THESE AND MOULDED ARTICLES PRODUCED THEREFROM

This application claims the benefit of European Patent Application No. 15 189 826.9, filed Oct. 14, 2015, the disclosure of which is incorporated herein by reference in its entirety for all purposes.

The invention relates to copolyamides which are formed from a diamine component, a dicarboxylic acid component and possibly a lactam- and/or ω-amino acid component. Furthermore, the invention relates to a polyamide moulding compound which comprises at least one of these copolyamides. Moulded articles produced from these moulding compounds are used in the automobile field, in the domestic field, in measuring-, regulating- and control technology or in mechanical engineering.

Thermoplastic, partially aromatic, partially crystalline polyamides represent a group of polyamides which are distinguished by their high temperature resistance. These polyamides can be used very well in high-temperature applications in various fields. In particular great strength at increased temperatures is thereby important.

Partially aromatic polyamides are known from WO 2014/198762, which are formed from terephthalic acid, possibly isophthalic acid as diacid and hexamethylene diamine and a further cyclic diamine as component.

WO 2008/155271 describes a production method for polyamides in which a dicarboxylic acid mixture of terephthalic acid and isophthalic acid is used, a part of the dicarboxylic acid mixture being able to be replaced by different dicarboxylic acids. Hexamethylene diamine which can be replaced by other diamines at specific proportions is used as diamine component. Starting from this state of the art, there is a further requirement for partially aromatic polyamides with an improved property profile with respect to their processability and also the mechanical properties at high temperatures.

It is therefore the object of the present invention to provide partially aromatic copolyamides with improved properties, in particular for high-temperature applications.

This object is achieved by the features of the copolyamides, the polyamide moulding compound, and the moulded articles described herein and the advantageous developments thereof.

According to the invention, copolyamides are provided which are formed from a diamine component A), a dicarboxylic acid component B) and possibly a lactam- and/or ω-amino acid component C). The diamine component A) is hereby used essentially in an equimolar manner relative to the dicarboxylic acid component B). The quantity of the lactam- and/or ω-amino acid component C) is in the range of 0-15% by mol. The sum of components A) to C) is thereby 100% by mol.

The diamine component A) is thereby selected from
A1) 62 to 96 proportions by mol of 1,6-hexanediamine,
A2) 4 to 38 proportions by mol of bis(aminomethyl)cyclohexane and also
A3) 0 to 30 proportions by mol of one or more cycloaliphatic diamines different from A2), the sum of A2) and A3) being 4 to 38 proportions by mol and the sum of A1), A2) and A3) being 100 proportions by mol.

The dicarboxylic acid component B) is selected from
B1) 64 to 100 proportions by mol of terephthalic acid,
B2) 0 to 18 proportions by mol of isophthalic acid and also
B3) 0 to 18 proportions by mol of one or more aliphatic dicarboxylic acids with 6 to 18 C-atoms,
the sum of B1), B2) and B3) being 100 proportions by mol.

The lactam- and/or ω-amino acid component C) is selected from one or more lactams and/or ω-amino acids, the sum of the lactams and/or ω-amino acids being 100 proportions by mol.

If the copolyamides according to the invention comprise only dicarboxylic acids and diamines, then the molar quantities thereof add up to 50% by mol for the sum of all the diamines and 50% by mol for the sum of all the dicarboxylic acids and the sum of the diamine- and dicarboxylic acid quantities produces 100% by mol for the copolyamide.

If the copolyamides according to the invention comprise, in addition to dicarboxylic acids and diamines, also lactams or ω-amino acids at X% by mol, then the sum of all the diamines is still only (50-0.5 X)% by mol and the sum of all the dicarboxylic acids is (50-0.5 X)% by mol, relative to 100% by mol of copolyamide.

In the case of the quantity details for the dicarboxylic acids and diamines of the copolyamides, it applies that the sum of the molar quantities of all the diamines is essentially equal to the sum of the molar quantities of all the dicarboxylic acids. Equal to essentially thereby means a maximum excess of the dicarboxylic acids or of the diamines of 3%, i.e. the molar ratio of dicarboxylic acids to diamines is 1.03:1 to 1:1.03. Preferably, a maximum excess of the dicarboxylic acids or of the diamines is of 2%, i.e. the molar ratio of dicarboxylic acids to diamines is 1.02:1 to 1:1.02.

The quantity details with respect to the monomers should thereby be understood such that a corresponding molar ratio of these monomers used in the polycondensation is also found again in the copolyamides produced in this way by polycondensation.

The spellings and abbreviations for polyamides and the monomers thereof are prescribed in the ISO standard 1874-1:2010. In this application, the following abbreviations for monomers occur, BAC for bis(aminomethyl)cyclohexane, 1,3-BAC for 1,3-bis(aminomethyl)cyclohexane, T for terephthalic acid, I for isophthalic acid and 6 for 1,6-hexanediamine.

A preferred embodiment provides that the diamine component A) is selected from
A1) 65 to 90 proportions by mol of 1,6-hexanediamine,
A2) 10 to 25 proportions by mol of bis(aminomethyl)cyclohexane and also
A3) 0 to 25 proportions by mol of one or more cycloaliphatic diamines different from A2),
the sum of A2) and A3) being 10 to 35 proportions by mol and the sum of A1), A2) and A3) being 100 proportions by mol.

Furthermore, it is preferred that the diamine component A) is selected from
A1) 70 to 82 proportions by mol of 1,6-hexanediamine,
A2) 18 to 30 proportions by mol of bis(aminomethyl)cyclohexane and also
A3) 0 to 12 proportions by mol of one or more cycloaliphatic diamines different from A2),
the sum of A2) and A3) being 18 to 30 proportions by mol and the sum of A1), A2) and A3) being 100 proportions by mol.

Preferably, the dicarboxylic acid component B) is selected from
B1) 70 to 100 proportions by mol of terephthalic acid,
B2) 0 to 15 proportions by mol of isophthalic acid and also B3) 0 to 15 proportions by mol of one or more aliphatic dicarboxylic acids with 6 to 18 C-atoms, and the sum of B1), B2) and B3) being 100 proportions by mol.

In a preferred embodiment, the quantity of component C) is 0 to 10% by mol, particularly preferably 0 to 5% by mol.

Preferably, component C) is selected from the group of lactams or ω-amino acids with 4, 6, 7, 8, 11, 12 C-atoms, consisting of pyrrolidin-2-one (4 C-atoms), caprolactam (6 C-atoms), oenanthlactam (7 C-atoms), capryllactam (8 C-atoms), laurinlactam (12 C-atoms), 4-aminobutanoic acid, 6-aminohexanoic acid, 7-aminoheptanoic acid, 8-aminooctanoic acid, 11-aminoundecanoic acid, 12-aminododecanoic acid and mixtures thereof.

Particularly preferably, component C) is selected from the group of lactams or ω-amino acids consisting of caprolactam (6 C-atoms), laurinlactam (12 C-atoms), 6-aminohexanoic acid and 12-aminododecanoic acid.

Preferably, component A3) is selected from the group of cycloaliphatic diamines consisting of bis(4-amino-3-methylcyclohexyl)methane, bis(4-aminocyclohexyl)methane, bis(4-amino-3-ethyl-cyclohexyl)methane, bis(4-amino-3,5-dimethylcyclohexyl)methane, bis(4-amino-3-methylcyclohexyl)-propane, bis(4-aminocyclohexyl) propane, isophorone diamine and mixtures thereof.

Particularly preferably, bis(4-amino-3-methylcyclohexyl (methan) is used as component A3).

Preferably, component B3) is selected from the group of aliphatic dicarboxylic acids with 6 to 18 C-atoms consisting of 1,6-hexanedioic acid, 1,9-nonanedioic acid, 1,10-decanedioic acid, 1,12-dodecanedioic acid, 1,13-tridecanedioc acid, 1,14-tetradecanedioic acid, 1,15-pentadecanoic acid, 1,16-hexadecanedioic acid, 1,18-octadecanedioic acid and mixtures thereof. 1,6-hexanedioic acid is used particularly preferably as component B3).

It is preferred that the sum of the proportions by mol of A2) of bis(aminomethyl)cyclohexane, A3) of cycloaliphatic diamine different from A2), B2) isophthalic acid and B3) aliphatic dicarboxylic acid is at most 38 proportions by mol, preferably at most 35 proportions by mol, particularly preferably at most 30 proportions by mol.

A further preferred embodiment provides that the copolyamides according to the invention have a glass transition temperature of at least 140° C., preferably of at least 145° C., particularly preferably of at least 150° C.

The mechanical properties of polyamides are temperature-dependent. Thus, the tensile modulus of elasticity decreases at temperatures above the glass transition temperature of a polyamide. This effect begins to show just below the glass transition temperature. At a higher glass transition temperature, the mechanical properties of polyamides hence remain unchanged for longer.

Preferably, the copolyamides according to the invention have a melting temperature of at most 350° C., preferably of at most 345° C., particularly preferably of 300 to 340° C.

Too high a melting temperature makes the processing of polyamides difficult, inter alia due to a narrow processing window, since the processing temperature is limited at the top because of degradation of the polymer.

It is preferred that the copolyamides according to the invention have a crystallisation capacity, determined as difference of melting heat and crystallisation heat, of at least 15 J/g, preferably at least of 20 J/g and particularly preferably of at least 25 J/g. The melting- and crystallisation heat is thereby determined by means of DSC measurement according to ISO 11357, the measuring values of the $3^{rd}$ heating being used.

The crystallisation capacity of a polyamide must be sufficiently high to enable a practicable processing speed and sufficient crystallinity in the finished part, e.g. in the injection moulding or during extrusion. If the crystallisation capacity is too low, the typical high-temperature properties, such as high thermal dimensional stability, are not achieved. At 11 to 15 J/g, the usability as high-temperature polymer is greatly impaired, if it is below 10 J/g it is no longer provided.

Preferably, the copolyamides according to the invention have a relative viscosity, measured at 20° C. and a concentration of 0.5 g/dl in m-cresol of 1.45 to 1.95, preferably of 1.50 to 1.75, particularly preferably 1.55 to 1.68.

Adjustment of the relative viscosity and hence of the molar mass can be effected in a manner known per se, e.g. via monofunctional amines or carboxylic acids, and/or difunctional diamines or dicarboxylic acids as chain regulators. Preferred monofunctional chain regulators for the copolyamides according to the invention are benzoic acid, acetic acid, propionic acid, butyric acid, valeric acid, caproic acid, lauric acid, stearic acid, 2-ethylhexane acid, cyclohexane acid, propylamine, butylamine, pentylamine, hexylamine, 2-ethylhexylamine, n-octylamine, n-nonylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, aniline or triacetone diamine. The chain regulators can be used individually or in combination. Also other monofunctional compounds which can react with an amino- or acid group, such as anhydrides, isocyanates, acid halogenides or esters, can be used as chain regulator. The normal quantity of use of the monofunctional chain regulators is between 10 and 200 mmol per kg of copolyamide.

It is preferred that the copolyamides according to the invention have a tensile modulus of elasticity between 2,400 and 4,200 MPa, preferably 2,500 to 4,000 MPa, particularly preferably 2,600 to 3,900 MPa.

In a preferred embodiment, the copolyamides according to the invention do not comprise lactams and/or ω-amino acids.

In a further preferred embodiment, the copolyamides according to the invention do not comprise isophthalic acid.

In a further preferred embodiment, the copolyamides according to the invention are formed from the monomers 1,6-hexanediamine A1), bis(aminomethyl)cyclohexane A2), terephthalic acid B1) and aliphatic dicarboxylic acids with 6 to 18 C-atoms B3).

In a further preferred embodiment, the copolyamides according to the invention do not comprise any aliphatic dicarboxylic acids.

In a further preferred embodiment, the copolyamides according to the invention are formed from the monomers 1,6-hexanediamine A1), bis(aminomethyl)cyclohexane A2), cycloaliphatic diamines A3) different from A2) and terephthalic acid B1).

In a further prefered embodiment, the copolyamides according to the invention do not comprise any cycloaliphatic diamines apart from bis(aminomethyl) cyclohexane.

In a very particularly preferred embodiment, the copolyamides according to the invention are formed from the monomers 1,6-hexanediamine A1), bis(aminomethyl)cyclohexane A2) and terephthalic acid B1).

The bis(aminomethyl)cyclohexane A2) is selected from the group consisting of 1,3 -bis(aminomethyl) cyclohexane, 1,4-bis(aminomethyl)cyclohexane and mixtures thereof. Preferably 1,3-bis(aminomethyl)cyclohexane is used.

According to the invention, polyamide moulding compounds which comprise at least one of the previously described copolyamides are likewise provided.

Preferably, the polyamide moulding compound according to the invention consists of I) 15 to 99.95% by weight of one or more copolyamides according to one of the claims 1 to 12,
II) 0.05 to 25% by weight of additives,
III) 0 to 70% by weight of reinforcing- and/or filling materials,
IV) 0 to 45% by weight of further polymers, different from component I), components I) to IV) adding up to 100% by weight.

The additives (component II) are preferably selected from the group consisting of inorganic stabilisers, organic stabilisers, in particular antioxidants, antiozonants, light-protection means, UV stabilisers, UV absorbers or UV blockers, IR absorbers, NIR absorbers, antiblocking means, nucleation agents, crystallisation accelerators, crystallisation retardants, condensation catalysts, chain regulators, defoamers, chain-lengthening additives, conductivity additives, separating means, lubricants, colourants, marking means, inorganic pigments, organic pigments, carbon black, graphite, carbon nanotubes, graphene, titanium dioxide, zinc sulphide, zinc oxide, barium sulphate, photochromic agents, antistatic agents, mould-release agents, optical brighteners, halogen-free flame-retardants, metallic pigments, metal flakes, metal-coated particles and mixtures thereof.

The additives can also be added in master batch form. A polyamide is preferably used as base polymer of the master batch. This polyamide is preferably selected from the group consisting of PA 6, PA 66, PA 12, PA 1012, PA 1212, PA 6/12, PA 6/66, PA 6/69 and mixtures thereof or consists of the copolyamide according to claims 1-12 itself.

The reinforcing- and filling materials (component III) are preferably selected from the group consisting of glass fibres, carbon fibres, metal fibres, whiskers, mineral fibres, synthetic layer silicates, natural layer silicates and mixtures hereof.

In the case of the glass- or carbon fibres, short fibres, long fibres or endless fibres (rovings) can be used.

The glass- or carbon fibres have a cross-section which is round, oval, elliptical, square or rectangular. Also fibres with a non-circular cross-section ("flat fibres") can be used, in particular oval, elliptical, square or rectangular ones. Amongst the flat fibres, flat glass fibres are particularly preferred.

The appearance of the glass fibres can be elongated or helical.

Glass fibres made of all glass sorts, such as e.g. A-, C-, D-, E-, M-, S-, R-glass, or any mixtures thereof, can be used. Glass fibres made of E-glass or glass fibres made of mixtures with E-glass or mixtures with E-glass fibres are preferred.

The short glass fibres preferably have a fibre length of 1 to 25 mm, preferably 1.5 to 20 mm, particularly preferably 2 to 12 mm and very particularly preferably of 2 to 8 mm.

The glass fibres preferably have a diameter of 5 to 20 μm, preferably of 5 to 15 μm and particularly preferably of 6 to 12 μm.

If the glass fibres are used as endless fibres (rovings) during the pultrusion process, they preferably have a diameter of at most 20 μm, preferably of at most 18 μm, particularly preferably of 5 to 14 μm.

The carbon fibres preferably have a diameter of 3 to 12 μm, preferably 4 to 10 μm, particularly preferably 4 to 9 μm.

All filling materials known to the person skilled in the art are possible as particulate filling materials. There are included herein, in particular particulate filling materials selected from the group consisting of minerals, talc, mica, dolomite, silicates, quartz, titanium dioxide, wollastonite, kaolin, silicic acids, magnesium carbonate, magnesium hydroxide, chalk, ground glass, glass flakes, ground carbon fibres, ground mineral fibres, ground glass fibres, ground or precipitated calcium carbonate, lime, feldspar, barium sulphate, permanent magnetic or magnetisable metals or alloys, glass balls, hollow glass balls, hollow-ball silicate filling materials and mixtures hereof.

The reinforcing- or filling materials can be surface-treated, i.e. they can be equipped with a suitable sizing- or adhesive system. For this purpose, for example systems based on fatty acids, waxes, silanes, titanates, polyamides, urethanes, polyhydroxy ethers, epoxides, nickel or respectively combinations or mixtures thereof, can be used. Preferably, both the reinforcing materials and the filling materials are surface-treated.

The further polymers (component IV) are preferably selected from the group consisting of polyamides, different from component I), polytetrafluoroethylene, polyphenylene sulphides, polyphenylene ethers and impact modifiers.

The impact modifiers are preferably selected from the group consisting of polyethylene, polypropylene, polyolefin copolymers, acrylate copolymers, acrylic acid copolymers, vinyl acetate copolymers, styrene copolymers, styrene block copolymers, ionic ethylene copolymers in which the acid groups are neutralised partially with metal ions, core-shell impact modifiers and mixtures thereof.

The impact modifiers are preferably functionalised with unsaturated carboxylic acids, unsaturated carboxylic acid derivatives and/or unsaturated glycidyl compounds and in fact by copolymerisation and/or grafting.

The conditions under which the copolymerisation or grafting takes place are common knowledge to the person skilled in the art.

The impact modifiers can also be used in the form of a mixture or a blend of unfunctionalised and/or functionalised impact modifiers.

The polyolefin copolymers are preferably selected from the group consisting of ethylene-α-olefin copolymers, propylene-α-olefin copolymers, ethylene-propylene copolymers, ethylene-propylene-diene copolymers and mixtures thereof, the α-olefins preferably having 3 to 18 carbon atoms.

Particularly preferably, the α-olefins are selected from the group consisting of propene, 1-butene, 1-pentene, 1-hexene, 1-octene, 1-decene, 1-dodecene and mixtures thereof.

According to the invention, moulded articles which are producible from the previously described moulding compounds or copolyamides are also provided. These moulded articles are present preferably in the form of a component which is useable for example in automobiles, in particular in the engine space, in the sanitary field, in particular for hot water applications, in the domestic field, in particular for coffee machines, water boilers, immersion coils, dishwashers, washing machines, in measuring-, regulating- and control technology, in particular for actuators, sensors, transmissions, compressed air controls, valves, both for hydraulics and pneumatics, or in mechanical engineering.

The production of the copolyamides and of the moulding compounds can be effected according to the following methods.

Production of the Copolyamides According to the Invention

Deionised water is placed in an autoclave and the monomers and possible additives, such as chain regulators, defoamers, condensation catalysts or heat stabilisers, are added. This is subsequently made inert several times with nitrogen. Heating to the reaction temperature of 250 to 280° C. takes place with agitation. This is effected at a pressure of at most 40 bar. The batch is kept in the pressure phase for 0.5 to 4 hours at the reaction temperature and subsequently is discharged with steam via a nozzle. The precondensate is dried for 12 to 36 hours at 100 to 120° C. and in a vacuum of 10 to 50 mbar.

The precondensate is post-condensed in a twin-screw extruder. For this purpose, cylinder temperatures of 10 to 170° C. are set in the first 3 to 4 zones, in the remaining zones cylinder temperatures of 300 to 380° C. with a rising and falling again temperature profile are used. The melt is degassed by a nitrogen stream 2 to 3 zones before the nozzle. The speed of rotation of the screws is set to 130 to 300 rpm. The polyamide is discharged as a strand through a nozzle and in fact at a nozzle temperature which is set to 310 to 370° C. The strand is cooled in a water bath at 10 to 80° C. and subsequently granulated. The granulate is dried for 12 to 36 hours at 100 to 120° C. and in a vacuum of 10 to 50 mbar or under nitrogen to a water content of below 0.1% by weight.

Suitable catalysts for accelerating the polycondensation reaction are phosphorus-containing acids such as, for example $H_3PO_2$, $H_3PO_3$, $H_3PO_4$, the salts thereof or organic derivatives. The catalysts are added in the range of 0.01 to 0.5% by weight, preferably 0.03 to 0.1% by weight, relative to the polyamide.

Suitable defoamers for avoiding foam formation during the degassing are aqueous, 10% emulsions which comprise silicones or silicone derivatives and are used in quantities of 0.01 to 1.0% by weight, preferably 0.01 to 0.10% by weight, relative to the polyamide.

Production of the Polyamide Moulding Compound According to the Invention

The copolyamides according to the invention can be equipped already during the polycondensation with additives, the additives then generally concerning substances which are intended to develop their effect during the polycondensation, such as chain regulators, defoamers, condensation catalysts or heat stabilisers.

The copolyamides according to the invention can also be equipped by compounding with additives, reinforcing materials, filling materials and/or further polymers. For this purpose, the dried copolyamide granulate I), the additives II) and possibly reinforcing- and/or filling materials III) and/or further polymers IV) are mixed (compounded) in the polymer melt on normal compounding machines, such as e.g. single or twin-screw extruders or screw kneaders. The components are thereby metered in individually and in fact into the feed or into a side feeder. Components I), II) and possibly component IV) can also be supplied in the form of a dry blend. Generally, the reinforcing materials or the filling materials are metered into the melt individually via gravimetric metering scales or side feeders.

For the dry blend production, the dried copolyamide granulate I), the additives II) and possibly further polymers IV) are mixed in a closed container. This mixture is homogenised for 10-40 minutes by means of a tumble mixer, eccentric mixer or tumble dryer. In order to avoid moisture absorption, this can be effected under dried protective gas.

The compounding is effected at set cylinder temperatures of 70 to 100° C. for the first housing and 300° C. to 380° C. for the remaining housings. A vacuum can be applied in front of the nozzle, degassing can take place atmospherically or under nitrogen. The speed of rotation of the screws is set to 130 to 300 rpm. The melt is discharged in strand form, cooled in the water bath at 10 to 80° C. and subsequently granulated. The granulate is dried for 12 to 36 hours at 100 to 120° C. and in a vacuum of 10 to 50 mbar or under nitrogen to a water content of below 0.1% by weight.

Within the scope of this application, the following measuring methods were used:

Relative Viscosity
  ISO 307
  Granulate
  0.5 g in 100 ml m-cresol
  Temperature 20° C.
  Calculation of the relative viscosity (RV) according to $RV=t/t_0$ following section 11 of the standard.

Glass Transition Temperature (Tg), Crystallisation Heat, Melting Heat and Melting Point:
  ISO 11357
  Granulate
  Differential Scanning calorimetry (DSC) was implemented at each of the three heatings at a heating rate of 20 K/min. After the first heating, cooling takes place at 20 K/min. After the second heating, the sample is quenched in dry ice.
  Glass transition temperature (Tg), crystallisation heat, melting heat and melting point are determined during the third heating.
  At the melting point, the temperature is indicated at the peak maximum.
  The average of the glass transition range which is indicated as glass transition temperature (Tg) was determined according to the "half height" method.

Tensile Modulus of Elasticity:
  ISO 527 at a tensile speed of 1 mm/min
  ISO tensile bar, standard: ISO/CD 3167, type A1, 170×20/10×4 mm,
  Temperature 23° C.

Tearing Strength and Breaking Elongation:
  ISO 527 at a tensile speed of 50 mm/min in the case of non-reinforced materials and 5 mm/min in the case of reinforced materials
  ISO tensile bar, standard: ISO/CD 3167, type A1, 170×20/10×4 mm,
  Temperature 23° C.

Impact Strength According to Charpy:
  ISO 179/*eU
  ISO test piece, standard: ISO/CD 3167, type B1, 80×10×4 mm,
  Temperature, 23° C.
  *1=not instrumented, 2=instrumented Notch Impact Strength According to Charpy:
  ISO 179/*eA
  ISO test piece: standard ISO/CD 3167, type B1, 80×10×4 mm, Temperature 23° C.
  *1=not instrumented, 2=instrumented The subject according to the invention is intended to be explained in more detail with reference to the subsequent examples without wishing to restrict said subject to the specific embodiments represented here.

The copolyamides of examples 1 to 15 of tables 2, 3 and 4 and of comparative examples 16 to 26 and 29 to 31 of tables 5, 6 and 8 comprise 0.13% by weight of phosphinic acid (CAS no. 6303-21-5, manufacturer Honeywell Specialty Chemicals, Germany) as condensation catalyst and 0.04% by weight of Antifoam RD 10% by weight of emulsion (CAS no. 9004-62-0, manufacturer Dow Corning S:A:, Belgium) as defoamer, the quantity data relating to the copolyamide.

The polyamide moulding compounds of example 28 and of comparative example 29 of table 7 comprise, as glass fibres, Vetrotex 995 EC10-4.5 (diameter 10 μm, length 4.5 mm, round cross-section, manufacturer Saint-Gobain Vetrotex, France), as heat stabiliser 1, Irganox 1098 (N,N'-hexane-1,6-diylbis[3(3,5-di-tert-butyl-4-hydroxyphenyl)propionamide], CAS no. 23128-74-7, manufacturer BASF SE, Germany) and, as heat stabiliser 2, Irgafos 168 (tris(2,4-di-tert-butylphenyl)phosphite, CAS no. 31570-04-4, manufacturer BASF SE, Germany).

Production of the Test Pieces

The test pieces were produced on an injection moulding machine of the Arburg Company, Model Allrounder 420 C 1000-250. The test pieces made of the non-reinforced copolyamides were manufactured with cylinder temperatures rising from 320° C. to 340° C. Those made of the reinforced polyamide moulding compounds of example 28 and of comparative example 29 were manufactured with cylinder temperatures rising from 340° C. to 360° C.

The mould temperature was always 150° C.

The test pieces were used in the dry state; for this purpose, they were stored after the injection moulding for at least 48 h at room temperature in a dry environment, i.e. over silica gel.

In table 1, the monomers used for the production of the copolyamides in the examples and comparative examples are listed.

The precondensate was post-condensed in a twin-screw extruder of the company Werner & Pfleiderer type ZSK 25. For this purpose, cylinder temperatures of 10 to 150° C. were set in the first 4 zones, in the remaining zones cylinder temperatures of 300 to 370° C. were used in a rising and falling again temperature profile. The melt was degassed in the second zone in front of the nozzle by a nitrogen flow. The speed of rotation of the screw was 250 rpm, the throughput 6 kg/h. The polyamide was discharged as a strand through a nozzle, a nozzle temperature of 320° C. being set. The strand was cooled in a water bath at 80° C. and subsequently granulated. The granulate was dried for 24 h at 120° C. and in a vacuum of 30 mbar to a water context of below 0.1% by weight.

Production of the Polyamide Moulding Compound of Example 28

The dried granulate of copolyamide I) was mixed together with the two heat stabilisers to form a dry blend, and in fact in the ratio indicated in table 7. This mixture (40 kg) was homogenised by means of a tumble mixer for approx. 20 minutes.

The polyamide moulding compound was produced on a twin-screw extruder of the company Werner & Pfleiderer type ZSK 25. The dry blend was thereby metered into the feed via metering scales. The glass fibre was conveyed into the melt via a side feeder 6 housing units before the nozzle.

TABLE 1

| Monomer | CAS No. | Melting range [° C.] | Trade name | Manufacturer |
| --- | --- | --- | --- | --- |
| 1,6-hexanediamine A1) | 124-09-4 | 39 to 42 | — | BASF SE, Germany |
| 1,3-bis(aminomethyl)-cyclohexane A2) | 2579-20-6 | <−70 | 1,3BAC | Mitsubishi Gas Chemical Company, Japan |
| bis(4-amino-3-methyl-cyclohexyl)methane A3a) | 6864-37-5 | −7 to −0.6* | Laromin C260 | BASF SE, Germany |
| bis(4-amino-cyclohexyl)methane A3b) | 1761-71-3 | −16 to 46 | 4,4'-diamino-dicyclohexyl-methane | BASF SE, Germany |
| terephthalic acid B1) | 100-21-0 | >400 | — | CEPSA, Spain |
| isophthalic acid B2) | 121-91-5 | 345 to 348 | — | Flint Hills Resources, Switzerland |
| 1,6-hexanedioic acid B3) | 124-04-9 | 151 | — | BASF SE, Germany |
| caprolactam Ca) | 105-60-2 | 68 to 71 | — | BASF SE, Germany |
| 12-aminododecanoic acid Cb) | 693-57-2 | 185 to 187 | — | UBE Industries, Japan |

*Freezing range according to ASTM D1015-55

Production of the Copolyamide PA 6T/1,3-BACT of Example 1

3.48 kg deionised water was placed in a 20 l autoclave, and 2.62 kg 1,6-hexanediamine A1), 0.80 kg 1,3-bis(aminomethyl)cyclohexane A2), 4.55 kg terephthalic acid B1) and 10.2 g phosphinic acid (50% by weight aqueous solution) were added as condensation catalyst and 3.2 g Antifoam RD 10% by weight emulsion as defoamer. Thereafter, the mixture was made inert six times with nitrogen. Heating to the reaction temperature of 260° C. took place with agitation. This was effected at a pressure of 32 bar. The batch was kept at the reaction temperature in the pressure phase for 1.5 hours and subsequently discharged with steam via a nozzle. The precondensate was dried for 24 hours at 110° C. and a vacuum of 30 mbar.

The temperature of the first housing was set to 80° C., that of the remaining housings to 300 to 350° C. A speed of rotation of 250 rpm and a throughput of 10 kg/h was used and degassing took place in the nitrogen flow in the third zone before the nozzle. The polyamide moulding compound discharged as strand was cooled in the water bath at 80° C., granulated and the obtained granulate was dried at 120° C. for 24 h in a vacuum at 30 mbar to a water content of below 0.1% by weight.

In tables 2 to 4, the compositions of examples 1 to 15 according to the invention are listed. At the same time, the measuring values determined for these examples are indicated.

TABLE 2

Examples 1 to 10: copolyamides according to the invention made of 50% by mol of component A) and 50% by mol of component B)

| Component | Unit | 1 | 2 | 3 | 4 | 5 | 6 | 7 | 8 | 9 | 10 |
|---|---|---|---|---|---|---|---|---|---|---|---|
| A1) 1,6-hexanediamine | proportions by mol | 80 | 65 | 70 | 70 | 65 | 78 | 64 | 70 | 82.5 | 85 |
| A2) 1,3-bis(aminomethyl)-cyclohexane | proportions by mol | 20 | 35 | 26 | 15 | 10 | 11 | 18 | 4 | 17.5 | 15 |
| A3a) bis(4-amino-3-methylcyclohexyl)methane | proportions by mol | — | — | 4 | 15 | 25 | 11 | 18 | 26 | — | — |
| B1) terephthalic acid | proportions by mol | 100 | 100 | 100 | 100 | 100 | 100 | 100 | 100 | 82.5 | 85 |
| B2) isophthalic acid | proportions by mol | — | — | — | — | — | — | — | — | 17.5 | 15 |
| Measuring values | | | | | | | | | | | |
| relative viscosity (RV)* | — | 1.72 | 1.65 | 1.70 | 1.70 | 1.63 | 1.63 | 1.77 | 1.64 | 1.62 | 1.63 |
| glass transition temperature** | °C. | 153 | 161 | 159 | 160 | 159 | 151 | 167 | 161 | 152 | 150 |
| melting point** | °C. | 337 | 322 | 323 | 332 | 331 | 343 | 319 | 335 | 325 | 335 |
| melting heat $\Delta H_f$** | J/g | 57 | 45 | 51 | 47 | 38 | 60 | 43 | 48 | 47 | 54 |
| crystallisation heat $\Delta H_c$** | J/g | 30 | 20 | 33 | 24 | 11 | 21 | 26 | 8 | 31 | 31 |
| $(\Delta H_f - \Delta H_c)$** | J/g | 27 | 25 | 18 | 23 | 27 | 39 | 17 | 40 | 19 | 23 |
| tensile modulus of elasticity | MPa | 3500 | 3300 | 3040 | 2660 | 3350 | 3120 | 2650 | 2890 | 3600 | 3850 |
| tearing strength | MPa | 92 | 98 | 100 | 79 | 60 | 76 | 58 | 58 | 63 | 65 |
| breaking elongation | % | 4.2 | 6.3 | 4.7 | 4.1 | 3.3 | 3.0 | 2.5 | 2.5 | 2.6 | 2.8 |
| impact strength Charpy 23° C. | kJ/m² | 75 | 102 | 133 | 115 | 62 | 72 | 85 | 55 | — | — |
| notch impact strength Charpy 23° C. | kJ/m² | 7 | 9 | 7 | 10 | 7 | 8 | 11 | 6 | — | — |

*RV relative viscosity, measured on a solution of 0.5 g polyamide in 100 ml m-cresol at 20° C.
**Values of the 3rd heating The copolyamides according to the invention of examples 1 to 10, in contrast to the copolyamide of comparative example 16, all comprise 1,3-bis(aminomethyl)cyclohexane A2), in part also bis(4-amino-3-methylcyclohexyl)methane A3a) (as further cycloaliphatic diamine) and in part also a small quantity of isophthalic acid B2). Due to these composition changes, the copolyamides according to the invention, relative to the copolyamide of comparative example 16, have a greatly increased glass transition temperature with generally improved crystallisation capacity.

TABLE 3

Examples 11 to 13: copolyamides according to the invention made of 50% by mol of component A) and 50% by mol of component B)

| | | Examples | | |
|---|---|---|---|---|
| | Unit | 11 | 12 | 13 |
| Component | | | | |
| A1) 1,6-hexandiamine | proportions by mol | 80 | 80 | 75 |
| A2) 1,3-bis(aminomethyl)cyclohexane | proportions by mol | 20 | 20 | 25 |
| B1) terephthalic acid | proportions by mol | 90 | 95 | 95 |
| B3) 1,6-hexanedioic acid | proportions by mol | 10 | 5 | 5 |
| Measuring values | | | | |
| relative viscosity (RV)* | — | 1.61 | 1.62 | 1.61 |
| glass transition temperature** | °C. | 144 | 147 | 149 |
| melting point** | °C. | 322 | 334 | 325 |
| melting heat $\Delta H_f$** | J/g | 47 | 60 | 60 |
| crystallisation heat $\Delta H_c$** | J/g | 7 | 11 | 28 |
| $(\Delta H_f - \Delta H_c)$** | J/g | 40 | 49 | 32 |
| tensile modulus of elasticity | MPa | 3,350 | 3,380 | 3,290 |

*RV relative viscosity, measured on a solution of 0.5 g polyamide in 100 ml m-cresol at 20° C.
**Values of the 3rd heating The copolyamides according to the invention of examples 11 to 13, in contrast to the copolyamide of comparative example 16, comprise 1,3-bis(aminomethyl)cyclohexane A2), 1,6-hexanedioic acid B3) (as aliphatic diacid) and no isophthalic acid B2). Due to these composition changes, the copolyamides according to the invention, relative to the copolyamide of comparative example 16, have a greatly increased glass transition temperature and a greatly improved crystallisation capacity.

according to the invention of the composition, the copolyamides according to the invention, relative to the copolyamide of comparative example 16, have a greatly increased glass transition temperature with slightly improved crystallisation capacity.

All of the copolyamides according to the invention of examples 1 to 15 comprise in the sum at most 38 proportions by mol of components A2) bis(aminomethyl)cyclohexane,

|  |  | Examples | | | |
|---|---|---|---|---|---|
|  | Unit | 14 | | 15 | |
| Component |  |  |  |  |  |
| A1) 1,6-hexandiamine | proportions by mol | 80 | component A) 48% by mol | 80 | component A) 48% by mol |
| A2) 1,3-bis(aminomethyl)cyclohexane | proportions by mol | 20 |  | 20 |  |
| B1) terephthalic acid | proportions by mol | 100 | component B) 48% by mol | 100 | component B) 48% by mol |
| Ca) caprolactam | proportions by mol | 100 | component C) 4% by mol | — | — |
| Cb) 12-aminododecanoic acid | proportions by mol | — | — | 100 | component C) 4% by mol |
| Measuring values |  |  |  |  |  |
| relative viscosity (RV)* | — |  | 1.62 |  | 1.59 |
| glass transition temperature** | ° C. |  | 149 |  | 141 |
| melting point** | ° C. |  | 329 |  | 325 |
| melting heat ΔH$_f$** | J/g |  | 50 |  | 50 |
| crystallisation heat ΔH$_c$** | J/g |  | 32 |  | 31 |
| (ΔH$_f$ − ΔH$_c$)** | J/g |  | 18 |  | 19 |
| tensile modulus of elasticity | MPa |  | 3,300 |  | 3,200 |

*RV relative viscosity, measured on a solution of 0.5 g polyamide in 100 ml m-cresol at 20° C.
**Values of the 3rd heating The copolyamides according to the invention of examples 14 and 15, in contrast to the copolyamide of comparative example 16, comprise 1,3-bis(aminomethyl)cyclohexane A2), caprolactam Ca) or 12-aminododecanoic acid Cb) (as component C)) and no isophthalic acid B2). By choice A3) further cycloaliphatic diamine, B2) isophthalic acid and B3) aliphatic dicarboxylic acid.

Tables 5 and 6 then show the compositions of comparative examples 16 to 26 with associated measuring values.

TABLE 5

Comparative examples 15 to 23: Copolyamides made of 50% by mol of component A) and 50% by mol of component B)

|  |  | Comparative examples | | | | | | | |
|---|---|---|---|---|---|---|---|---|---|
| Component | Unit | 16 | 17 | 18 | 19 | 20 | 21 | 22 | 23 |
| A1) 1,6-hexanediamine | proportions by mol | 100 | 100 | 60 | 80 | 58 | 75 | 73 | 76 |
| A2) 1,3-bis(aminomethyl)cyclohexane | proportions by mol | — | — | 40 | 20 | 12 | 20 | — | — |
| A3a) bis(4-amino-3-methylcyclohexyl)methane | proportions by mol | — | — | — | — | 30 | 30 | 27 | 24 |
| B1) terephthalic acid | proportions by mol | 70 | 55 | 100 | 80 | 100 | 75 | 73 | 76 |
| B2) isophthalic acid | proportions by mol | 30 | — | — | 20 | — | 25 | 27 | 24 |
| B3) 1,6-hexanedioic acid | proportions by mol | — | 45 | — | — | — | — | — | — |
| Measuring values |  |  |  |  |  |  |  |  |  |
| relative viscosity* | — | 1.58 | 1.72 | 1.70 | 1.60 | 1.66 | 1.58 | 1.79 | 1.76 |
| glass transition temperature** | ° C. | 130 | 94 | 166 | 148 | 170 | 151 | 154 | 142 |
| melting point** | ° C. | 325 | 302 | 301 | 318 | 317 | 310 | 314 | 324 |
| melting heat ΔH$_f$** | ° C. | 46 | 49 | 36 | 40 | 18 | 37 | 35 | 42 |
| crystallisation heat ΔH$_c$** | J/g | 29 | 18 | 33 | 36 | 13 | 31 | 33 | 34 |
| (ΔH$_f$ − ΔH$_c$)** | J/g | 17 | 31 | 3 | 4 | 5 | 6 | 2 | 8 |
| tensile modulus of elasticity | MPa | 3,300 | 3,100 | 2,840 | — | — | — | 2,580 | 2,600 |
| tearing strength | MPa | 100 | 73 | 103 | — | — | — | 74 | 74 |

TABLE 5-continued

Comparative examples 15 to 23: Copolyamides made of 50% by mol of component A) and 50% by mol of component B)

| Component | Unit | Comparative examples | | | | | | | |
|---|---|---|---|---|---|---|---|---|---|
| | | 16 | 17 | 18 | 19 | 20 | 21 | 22 | 23 |
| breaking elongation | % | 5.0 | 15 | 9.5 | — | — | — | 66 | 70 |
| impact strength Charpy 23° C. | kJ/m² | 80 | 80 | 116 | — | — | — | 124 | 128 |
| notch impact strength Charpy 23° C. | kJ/m² | 6 | 7 | 10 | — | — | — | 15 | 15 |

\* RV relative viscosity, measured on a solution of 0.5 g polyamide in 100 ml m-cresol at 20° C.
\*\* Values of the 3rd heating The copolyamide of comparative example 17 has 45 proportions by mol of 1,6-hexanedioic acid B3) and displays a very low glass transition temperature of only 94° C. The copolyamide of comparative example 18 with 40 proportions by mol of 1,3-bis(aminomethyl)cyclohexane A2) displays an extremely low crystallisation capacity.

Extremely low crystallisation capacities are also shown by the copolyamides of comparative examples 19 to 23 in which the sum of the proportions by mol of components A2 bis(aminomethyl)cyclohexane, A3) further cycloaliphatic diamine, B2) isophthalic acid and B3) aliphatic dicarboxylic acid is at 40 to 54 proportions by mol.

TABLE 6

Comparative examples 24 to 26: Copolyamides made of 50% by mol of component A) and 50% by mol of component B)

| | Unit | Comparative examples | | |
|---|---|---|---|---|
| | | 24 | 25 | 26 |
| Component | | | | |
| A1) 1,6-hexandiamine | proportions by mol | 70 | 75 | 80 |
| A2) 1,3-bis(aminomethyl)-cyclohexane | proportions by mol | 30 | 25 | 20 |
| B1) terephthalic acid | proportions by mol | 80 | 80 | 80 |
| B3) 1,6-hexanedioic acid | proportions by mol | 20 | 20 | 20 |
| Measuring values | | | | |
| relative viscosity (RV)* | — | 1.60 | 1.61 | 1.63 |
| glass transition temperature** | ° C. | 139 | 137 | 133 |
| melting point** | ° C. | 290 | 291 | 300 |
| melting heat $\Delta H_f$** | J/g | 30 | 37 | 40 |
| crystallisation heat $\Delta H_c$** | J/g | 29 | 28 | 29 |
| $(\Delta H_f - \Delta H_c)$** | J/g | 1 | 9 | 11 |
| tensile modulus of elasticity | MPa | 3,110 | 3,160 | 3,180 |

\*RV relative viscosity, measured on a solution of 0.5 g polyamide in 100 ml m-cresol at 20° C.
\*\*Values of the 3rd heating The copolyamides of comparative examples 24 to 26, relative to the copolyamide of comparative example 16, generally have only slightly increased glass transition temperatures and these at low to extremely low crystallisation capacities. The sum of the proportions by mol of components A2) 1,3-bis(aminomethyl)cyclohexane, B2) isophthalic acid and B3) aliphatic dicarboxylic acid is, in the copolyamides of comparative examples 24 to 26, at 40 to 50 proportions by mol.

Table 7 then shows the compositions of example 27 and of comparative example 28 with associated measuring values.

TABLE 7

Compounds with glass fibres

| | Units | Example 27 | Comparative example 28 |
|---|---|---|---|
| Component | | | |
| PA 6T/1,3-BACT (70/30% by mol) copolyamide of example 1 | % by weight | 59.7 | — |
| PA 6T/6I (70/30% by mol) copolyamide of comparative example 16 | % by weight | — | 59.7 |
| glass fibres | % by weight | 40 | 40 |
| heat stabiliser 1 | % by weight | 0.15 | 0.15 |
| heat stabiliser 2 | % by weight | 0.15 | 0.15 |
| Measuring values | | | |
| relative viscosity (RV)* | — | 1.62 | 1.63 |
| tensile modulus of elasticity at 23° C. | MPa | 14,080 | 14,350 |
| tensile modulus of elasticity at 100° C. | MPa | 11,610 | 11,920 |
| tensile modulus of elasticity at 110° C. | MPa | 11,580 | 11,230 |
| tensile modulus of elasticity at 120° C. | MPa | 11,520 | 10,520 |
| tensile modulus of elasticity at 140° C. | MPa | 9,460 | 6,130 |

\*RV relative viscosity, measured on a solution of 0.5 g polyamide in 100 ml m-cresol at 20° C.

The reinforced polyamide moulding compound of example 27 with the copolyamide according to the invention of example 1 as basis, relative to the reinforced polyamide moulding compound of comparative example 28 with the copolyamide of comparative example 16 as basis, displays from temperatures of 110° C. a higher tensile modulus of elasticity.

Table 8 then shows the compositions of comparative examples 29 to 31 with associated measuring values.

TABLE 8

Comparative examples 29 to 31: copolyamides made of 50% by mol of component A) and 50% by mol of component B)

|  | Unit | Comparative examples |  |  |
|---|---|---|---|---|
|  |  | 29 | 30 | 31 |
| Component |  |  |  |  |
| A1) 1,6-hexandiamine | proportions by mol | 77 | 83 | 79 |
| A3a) bis(4-amino-3-methylcyclohexyl)-methane | proportions by mol | 23 | 17 | — |
| A3b) bis(4-aminocyclohexyl)-methane | proportions by mol | — | — | 21 |
| B1) terephthalic acid | proportions by mol | 100 | 83 | 79 |
| B2) isophthalic acid | proportions by mol | — | 17 | 21 |
| Measuring values |  |  |  |  |
| rel. viscosity* | — | 1.50 | 1.56 | 1.66 |
| glass transition temperature** | ° C. | 137 | 142 | 161 |
| melting point** | ° C. | 342 | 324 | 310 |
| melting heat $\Delta H_f$** | ° C. | 54 | 34 | 26 |
| crystallisation heat $\Delta H_c$** | J/g | 14 | 42 | 26 |
| $(\Delta H_f - \Delta H_c)$** | J/g | 40 | 8 | 0 |
| tensile modulus of elasticity | MPa | — | 2,600 | 2,870 |
| tearing strength | MPa | — | 88 | 72 |
| breaking elongation | % | — | 28 | 3.2 |
| impact strength Charpy 23° C. | kJ/m$^2$ | — | nb*** | 85 |
| notch impact strength Charpy 23° C. | kJ/m$^2$ | — | 14 | 9 |

*RV relative viscosity, measured on a solution of 0.5 g polyamide in 100 ml m-cresol at 20° C.
**Values of the 3rd heating
***nb no breakage The copolyamides of comparative examples 29 and 31 have compositions as are claimed in WO 2014/198762. The copolyamide of comparative example 29 displays, with the composition 38.5% by mol of 1,6-hexanediamine A1), 11.5% by mol of bis(4-amino-3-methylcyclohexyl)methane A3a) and 50% by mol of terephthalic acid B1), an only slightly increased glass transition temperature, relative to comparative example 16, and does not reach the glass transition temperatures of examples 1 to 15 according to the invention.

The copolyamide of comparative example 30 reveals, with the composition 41.5% by mol of 1,6-hexanediamine A1), 8.5% by mol of bis(4-amino-3-methylcyclohexyl)methane A3a), 41.5% by mol of terephthalic acid B1) and 8.5% by mol of isophthalic acid B2), in fact a significantly increased glass transition temperature, however this is with an extremely low crystallisation capacity. The same applies for comparative example 31 with the composition 39.5% by mol of 1,6-hexanediamine A1), 10.5% by mol of bis(4-aminocyclohexyl)methane A3b), 39.5% by mol of terephthalic acid B1) and 10.5% by mol of isophthalic acid B2).

The invention claimed is:

1. A copolyamide formed from
a diamine component A),
a dicarboxylic acid component B), and
optionally a lactam- and/or ω-amino acid component C),
wherein the diamine component A) is utilized essentially in an equimolar amount relative to the dicarboxylic acid component B), the quantity of the lactam- and/or ω-amino acid component C) being 0-15% by mol, and the sum of components A) to C) being 100% by mol, wherein:
a) the diamine component A) consists of
A1) 65 to 85 proportions by mol of 1,6-hexanediamine,
A2) 4 to 35 proportions by mol of bis(aminomethyl) cyclohexane, and
A3) 0 to 26 proportions by mol of one or more cycloaliphatic diamines different from A2),
the sum of A2) and A3) being 4 to 35 proportions by mol and the sum of A1), A2) and A3) being 100 proportions by mol,
b) the dicarboxylic acid component B) consists of
B1) 82 to 100 proportions by mol of terephthalic acid,
B2) 0 to 18 proportions by mol of isophthalic acid, and
B3) 0 to 18 proportions by mol of one or more aliphatic dicarboxylic acids with 6 to 18 C-atoms,
the sum of B1), B2) and B3) being 100 proportions by mol, and
c) the lactam- and/or ω-amino acid component C) consists of one or more lactams and/or ω-amino acids, the sum of the lactams and/or ω-amino acids being 100 proportions by mol;
wherein the copolyamide has a glass transition temperature of at least 140° C.

2. The copolyamide according to claim 1, wherein the diamine component A) is selected from
A1) 65 to 85 proportions by mol of 1,6-hexanediamine,
A2) 10 to 25 proportions by mol of bis(aminomethyl) cyclohexane, and
A3) 0 to 25 proportions by mol of one or more cycloaliphatic diamines different from A2),
the sum of A2) and A3) being 10 to 35 proportions by mol and the sum of A1), A2) and A3) being 100 proportions by mol.

3. The copolyamide according to claim 1, wherein the diamine component A) is selected from
A1) 70 to 82 proportions by mol of 1,6-hexanediamine,
A2) 18 to 30 proportions by mol of bis(aminomethyl) cyclohexane, and
A3) 0 to 12 proportions by mol of one or more cycloaliphatic diamines different from A2),
the sum of A2) and A3) being 18 to 30 proportions by mol and the sum of A1), A2) and A3) being 100 proportions by mol.

4. The copolyamide according to claim 1, wherein the dicarboxylic acid component B) is selected from
B1) 85 to 100 proportions by mol of terephthalic acid,
B2) 0 to 15 proportions by mol of isophthalic acid, and
B3) 0 to 15 proportions by mol of one or more aliphatic dicarboxylic acids with 6 to 18 C-atoms,
and the sum of B1), B2) and B3) being 100 proportions by mol.

5. The copolyamide according to claim 1, wherein the dicarboxylic acid component B) is selected from
B1) 90 to 100 proportions by mol of terephthalic acid,
B2) 0 to 10 proportions by mol of isophthalic acid, and
B3) 0 to 10 proportions by mol of one or more aliphatic dicarboxylic acids with 6 to 18 C-atoms,
and the sum of B1), B2) and B3) being 100 proportions by mol.

6. The copolyamide according to claim 1, wherein the quantity of component C) is 0 to 10% by mol.

7. The copolyamide according to claim 1, wherein sum of the proportions by mol of A2) bis(aminomethyl)

cyclohexane, A3) cycloaliphatic diamine, B2) isophthalic acid, and B3) aliphatic dicarboxylic acid is at most 38 proportions by mol.

8. The copolyamide according to claim 1, which has a melting temperature of at most 350° C.

9. The copolyamide according to claim 1, which has a relative viscosity, measured at 20° C. and a concentration of 0.5 g/dl in m-cresol, of 1.45 to 1.95.

10. The copolyamide according to claim 1, which has a tensile modulus of elasticity between 2,400 and 4,200 MPa.

11. A polyamide moulding compound comprising one or more copolyamides according to claim 1.

12. The polyamide moulding compound according to claim 11, consisting of
  I) 15 to 99.95% by weight of one or more of the copolyamides,
  III) 0.05 to 25% by weight of additives,
  III) 0 to 70% by weight of reinforcing- and/or filling materials,
  IV) 0 to 45% by weight of further polymers different from component I), components I) to IV) adding up to 100% by weight.

13. A moulded article produced from a polyamide moulding compound according to claim 11.

14. The copolyamide of claim 1, which has a crystallisation capacity, which is a difference between melting heat and crystallisation heat, of at least 15 J/g.

* * * * *